Figure 1:
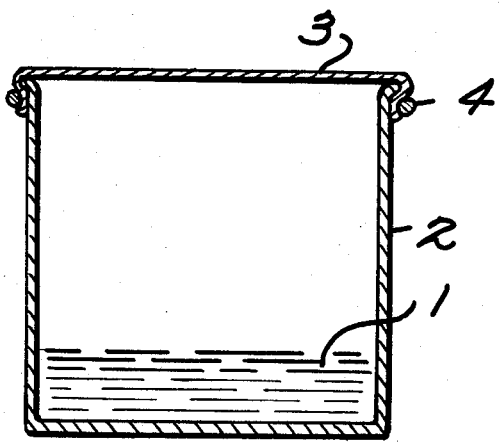

United States Patent [19]

Markus et al.

[11] Patent Number: 4,602,045
[45] Date of Patent: Jul. 22, 1986

[54] CATION-EXCHANGE RESINS AND USE AS MEMBRANES IN ELECTROLYTIC CELLS

[75] Inventors: Michael V. Markus, East Malvern; George H. Barnett, North Balwyn, both of Australia

[73] Assignee: ICI Australia Limited, Melbourne, Australia

[21] Appl. No.: 732,900

[22] PCT Filed: Nov. 26, 1981

[86] PCT No.: PCT/AU81/00171

§ 371 Date: Jun. 17, 1982

§ 102(e) Date: Jun. 17, 1982

[87] PCT Pub. No.: WO82/01882

PCT Pub. Date: Jun. 10, 1982

Related U.S. Application Data

[63] Continuation of Ser. No. 395,055, Jun. 17, 1982, abandoned.

[30] Foreign Application Priority Data

Nov. 27, 1980 [AU] Australia .............................. PE6668

[51] Int. Cl.[4] .................. C08F 259/08; C08F 214/26; C08F 2/54; C08J 7/18
[52] U.S. Cl. ........................................ 521/27; 521/31; 522/3; 522/120; 522/156; 525/276; 204/296; 427/36; 427/44; 428/520
[58] Field of Search ...................... 521/31; 204/159.16

[56] References Cited

U.S. PATENT DOCUMENTS

| | | | |
|---|---|---|---|
| 3,666,693 | 5/1972 | Chapiro et al. | 204/159.16 X |
| 3,839,172 | 10/1974 | Chapiro et al. | 204/159.17 |
| 4,065,366 | 12/1977 | Oda et al. | 204/98 |
| 4,176,215 | 11/1979 | Molnar et al. | 521/27 |
| 4,332,665 | 6/1982 | Kimoto et al. | 204/296 |
| 4,357,218 | 11/1982 | Seko | 204/98 |
| 4,385,130 | 5/1983 | Molinski et al. | 521/31 |

FOREIGN PATENT DOCUMENTS

| | | |
|---|---|---|
| 250282 | 3/1964 | Australia . |
| 290547 | 8/1964 | Australia . |
| 52-23192 | 2/1977 | Japan ........................ 521/27 |
| 1516048 | 6/1978 | United Kingdom . |

OTHER PUBLICATIONS

Japan, Chem. Abs., vol. 94, Abs. 94, 31518v and 31744r (1981).
Partial Translation of Asawa et al., Kokai 52-23192.

*Primary Examiner*—John C. Bleutge
*Assistant Examiner*—A. H. Koeckert
*Attorney, Agent, or Firm*—Cushman, Darby & Cushman

[57] ABSTRACT

Process of radiation graft polymerizing a fluorinated unsaturated carboxylic acid monomer to a fluoropolymeric permselective membrane in order to improve its performance when used in an electrolysis cell.

8 Claims, 2 Drawing Figures

CATION-EXCHANGE RESINS AND USE AS MEMBRANES IN ELECTROLYTIC CELLS

This is a continuation of application Ser. No. 395,055 filed June 17, 1982, now abandoned.

The present invention relates to membranes comprising cation-exchange resins and to their use in electrolytic cells, particularly to their use as permselective membranes in chlor-alkali electrolytic cells, and to the improvement of the selectivity of such resins and membranes.

Chlor-alkali electrolytic cells are used to manufacture chlorine and alkali metal hydroxide solution by the electrolysis of an alkali metal chloride solution. Either mercury or diaphgragm cells are generally used for this purpose. Mercury cells have the advantage of producing concentrated alkali metal hydroxide solutions substantially free of alkali metal chloride but give rise to problems associated with the disposal of mercury-containing effluents. On the other hand, diaphragm cells, in which the anodes and cathodes are separated by porous diaphragms which permit the passage of both positive and negative ions and of alkali metal chloride electrolyte, avoid the aforesaid effluent problem but suffer from the disadvantages that (1) relatively weak alkali metal hydroxide solutions are produced which must be evaporated to increase the concentration of the solution, (2) there is a possibility of the product gases, namely hydrogen and chlorine, becoming mixed, and (3) the alkali metal hydroxide solution which is produced is contaminated with a high concentration of alkali metal chloride and the solution must be purified in order to remove this alkali metal chloride.

Attempts have been made to overcome the disadvantages of both mercury cells and diaphragm cells by the use of cells in which the anodes and cathodes are separated by cation permselective membranes. Such membranes are selectively permeable and allow the passage of only positively charged ions and inhibit the passage of bulk electrolyte and negatively charged ions. Cation permselective membranes which have been proposed for use in chlor-alkali electrolytic cells include, for example, those made of fluoropolymers containing cation-exchange groups, for example sulphonate, carboxylate or phosphonate groups and their derivatives.

Fluoropolymers which will withstand cell conditions for long periods of time are preferred, for example the perfluorosulphonic acid-type membranes manufactured and sold by E I DuPont de Nemours and Company under the registered trade mark 'NAFION' and which are based upon cation-exchange resins which are hydrolysed copolymers of perfluoro-olefins, for example tetrafluoroethylene, and perfluorovinyl ethers containing sulphonic acid groups or derivatives thereof. Such membranes are described for example in U.S. Pat. Nos. 2,636,851; 3,017,338; 3,496,077; 3,560,568; 2,967,807; 3,282,875 and UK Pat. No. 1 184 321. Other fluoropolymer membranes which may be used in chlor-alkali electrolytic cells are those manufactured and sold by Asahi Glass Company Ltd under the trade mark 'FLEMION-'and which are described for example in UK Pat. Nos. 1 516 048, 1 522 877, 1 518 387 and 1 531 068.

Although such membranes have many desirable properties which make them attractive for use in the harsh chemical environment of a chlor-alkali cell, such as good long-term chemical stability, their current efficiencies are not as high as is desired, especially when the sodium hydroxide is produced at high concentrations. As the sodium hydroxide concentration in the catholyte is increased so the tendency for back-migration of the hydroxyl ions to the anolyte is increased. This causes a drop in the current efficiency of the cell. Larger amounts of oxygen impurity in the chlorine are thereby produced, and there is a greater buildup of chlorate and hypochlorite contaminants in the brine, which contaminants must be removed and discarded to maintain acceptable cell operation. Current efficiencies of at least 90% are highly desirable.

The degree of back-migration of hydroxyl ions is related to the number and nature of the active sites in the membrane. However there is a "trade-off" situation between the number and nature of active sites, the voltage drop across the membrane and the thickness of the membrane which is required to impart mechanical strength. Thus in films thick enough to be used as membranes in chlor-alkali electrolysis cells and which have active sites in number and nature so as to render the film highly impermeable to back-migration of hydroxyl ions, the voltage drop is unacceptably high.

This has led to the development of multilayer membranes having a layer on the catholyte side which has a high degree of hydroxyl ion impermeability. The other layer(s), which provides the physical strength, is highly permeable to cations.

Such membranes have been made by lamination processes or by chemical modifications of the active sites or by an impregnation process.

Laminated membranes are disclosed, for example, in U.S. Pat. Nos. 3,909,378 and 4,176,215. Laminated membranes possess the potential disadvantage of delamination in use because of the physical forces arising from differential swelling of the two layers of the composite membrane which cause blistering and distortion.

Australian Pat. No. 481 904 discloses the chemical modification of the catholyte surface layer of a membrane having sulphonic acid active sites by treating it with ethylene diamine. The sulphonic acid groups to a depth of up to 75 microns are thereby converted into sulphonamide groups. Another method of chemically modifying the sulphonic acid active groups is disclosed in Japanese patent publication No. 53 116 287 in which it is disclosed to convert the sulphonic acid groups to carboxylic acid groups. Such processes are complex and difficult to control to achieve surface layers of the desired thickness. Moreover the chemical stability of the membranes in the conditions of a chlor-alkali cell are adversely changed, particularly in the case of the sulphonamides.

The impregnation process is exemplified in Japanese patent publication No. 54 038 286. The catholyte surface of a membrane is impregnated with monomers which are then polymerized to form a barrier to the passage of hydroxyl ions. The main disadvantage of this process lies in the susceptibility of the blocking polymer to leaching by the liquids in the cell because it is only physically associated with the substrate polymer and is not chemically bound to it.

We have now found a process whereby the resistance of a fluoropolymeric permselective membrane to back-migration of hydroxyl ions is significantly increased by a modification to the membrane to produce a higher fixed charge concentration than that of the unmodified membrane. The modification is the graft copolymerization of a fluorinated unsaturated carboxylic acid monomer to the fluoropolymeric membrane by radiation grafting.

'Graft copolymerization' is defined in "Organic Chemistry of Synthetic High Polymers" by R W Lenz; Interscience Publishers 1967 page 251.

Accordingly the present invention provides a process for treating a fluoropolymeric permselective membrane in order to improve its resistance to the back-migration of hydroxyl ions when it is used in a chlor-alkali electrolysis cell, said process comprising irradiating the said membrane with high energy radiation to generate free radical sites therein and treating the said membrane with a monomeric material comprising a fluorinated unsaturated carboxylic acid or a derivative thereof so that the said monomeric material graft copolymerizes with the fluoropolymer to form a copolymeric component therein.

The modified fluoropolymeric membranes produced by the process of our invention have a number of advantages over the prior art modified membranes. In contrast to the sulphonic acid membranes referred to above instead of a loss in the number of active sites there is an increase due to the carboxylic acid groups on the monomer. There is thus no need to critically control the depth or extent of the modification of the membrane, and our process may conveniently be applied to substantially the whole depth of the fluoropolymeric membrane.

Furthermore since the process of our invention leads to chemical bonding of the monomer to the fluoropolymeric membrane, the modified membranes so produced are not susceptible to the leaching problems of the prior art modifying polymers which are in simple physical association with the substrate membrane.

The fluoropolymeric membranes to which the process of this invention is advantageously applied are exemplified by those described hereinbefore.

The monomeric material which is capable of being radiation grafted to the substrate fluoropolymeric membrane by our process to produce improved membranes comprises at least one aliphatic fluorinated unsaturated carboxylic acid or a derivative thereof. Suitable carboxylic acids and derivatives are those represented by the following general formula $$CF_2=CF-X-COOR$$

in which X represents $(CF_2)_a$ or 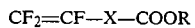

$$O-(CF_2-CF_2-O)_b-(CF_2)_c$$ 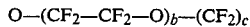

when
a is zero, one or more
b is zero, one or more
c is zero, one or more
and R is hydrogen or a lower alkyl group containing no more than six carbon atoms, preferably not more than three.

Preferably neither 'a' nor 'c' exceeds 6 and 'b' does not exceed 4.

Preferred monomers for use in our process include pentafluorobut-3-enoic acid, methyl pentafluorobut-3-enoate, and ethyl pentafluorobut-3-enoate.

Graft copolymerization reactions require high energies of initiation. The radiation used in the method of the present invention should have a wavelength of less than 100 Angstroms and an energy value of greater than 100 ev. Suitably the radiation used to initiate the graft copolymerisation is in the form of γ-rays, X-rays or electron beams; γ-rays are the preferred form.

There are several suitable techniques of radiation grafting which may be used in the process of this invention. For example, the membrane may be immersed in a liquid phase containing the monomer with which it is to be graft copolymerized and subjected to continuous or intermittent irradiation, preferably in the absence of oxygen. Alternatively, but less preferably, the membrane may be pre-irradiated prior to bringing it into contact with the liquid containing the monomer material.

The monomer material may be a liquid per se, or it may be dissolved in a suitable solvent, for example methanol, toluene, 1,1,2-trichlorotrifluoroethane ($CFCl_2-CF_2Cl$) or water.

Figure 2:
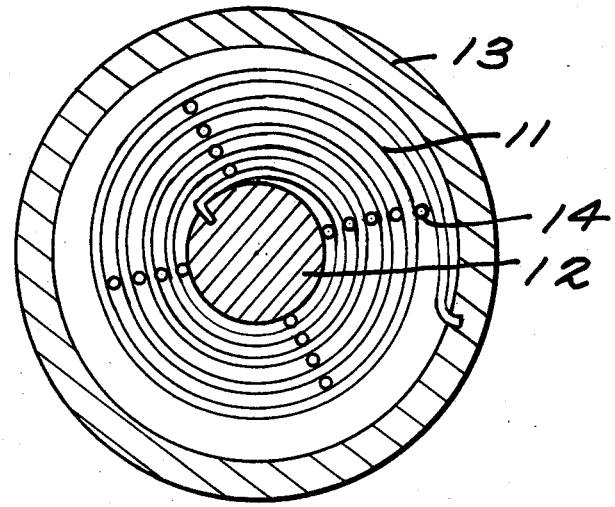

FIGS. 1 and 2 illustrate two ways of practicing the invention, FIG. 1 being a vertical sectional view through a suitable reaction vessel while FIG. 2 is a plan view of another reaction vessel.

The nature of the reaction vessel used to carry out the process of our invention is not narrowly critical and will be apparent to those skilled in the art of radiation polymerization. One technique which we have found to be particularly effective will now be described with reference to FIG. 1.

A sample 1 of the monomeric material in liquid form is contained in a vessel 2, having an open mouth at the top. The sample of membrane material 3, is stretched across the mouth and sealed on with a sealing ring 4. The monomeric liquid forms a vapour in contact with the membrane and this monomeric material in the vapour phase will graft copolymerize with the membrane under the influence of high energy radiation.

Optionally the process of our invention may be used to treat one or both surfaces of a fluoropolymeric membrane, in particular the surface which is exposed to the catholyte in the chlor-alkali cell. Where it is desired to apply the process to a single surface of a membrane, the process may conveniently be carried out with a technique which will now be described with reference to FIG. 2.

Two strips of the permselective membrane, 11, to be treated are placed together in continuous contact with each other. They are spirally wound on a spool 12 and placed in a hollow cylindrical container 13. For the sake of clarity the two strips are shown separately in FIG. 2, but in practice they are contiguous with each other. The spiral windings are separated by spacers 14. The hollow cylinder, 13 containing the two membranes is filled with monomeric material in the form of a liquid or a vapour. The whole is subjected to irradiation to cause graft polymerization to take place on the exposed surface of each membrane. After treatment the membranes are unwound and separated.

The process is particularly effective when applied to membranes of the 'NAFION' type, that is, to membranes derived from copolymers of tetrafluoroethylene and perfluorovinyl sulfonyl fluoride. The amount of grafted monomer may be determined to some extent by the desired improvement in the performance of the fluoropolymeric membrane. In most cases a significant improvement in performance is achieved by the incorporation by grafting of 3 to 5% w/w of monomer, measured as the weight increase of the membrane after grafting, and preferably less than 12% w/w of monomer is incorporated.

The improved membranes prepared by the process of the present invention are more effective in preventing back migration of the hydroxyl ions from the catholyte compartment of a chlor-alkali cell than the precursor membranes from which they have been made. Hence under similar operating conditions in a chlor-alkali cell than the precursor membranes from which they have been made. Hence under similar operating conditions in a chlor-alkali electrolysis cell they will exhibit a higher current efficiency.

The improved membranes of this invention may also be usefully employed in other electrochemical systems, for example, as separators and/or solid electrolytes in batteries, fuel cells and electrolysis cells.

The invention is now illustrated by, but not limited to, the following examples in which all parts and percentages are by weight unless otherwise stated.

EXAMPLE 1

A film of 'NAFION' 390 was mounted in a device such as is illustrated in FIG. 1 whereby one surface of the film 3 is exposed to the vapour from a liquid monomer 1 which was in this example pentafluorobut-3-enoic acid $$CF_2=CFCF_2COOH.$$

The whole assembly was exposed, in an oxygen free atmosphere, to $\gamma$-radiation from a $Co^{60}$ source at a dose rate of 6 krad/hour at 25° C. The absorbed dose was 2.5 Mrad.

The film weight increased by 4.1%.

The treated film was conditioned in 30% w/w sodium hydroxide solution prior to being mounted in an electrolysis test cell which was operated so that 25% w/w sodium hydroxide solution was produced in the catholyte compartment and chlorine evolved at the anode.

The current efficiency (ie the weight of sodium hydroxide produced expressed as a percentage of the theoretical sodium hydroxide yield equivalent to the current passed) under steady operating conditions was 93%. The current efficiency of cell operating under similar conditions with a membrane of untreated 'NAFION' 390 was 80%.

This demonstrates the utility of the process of the present invention.

EXAMPLE 2

The conditions of example 1 were repeated except that the $\gamma$-radiation dose rate was increased to 15 krad/hour but the exposure time reduced so that the absorbed dose was 1.5 Mrad.

The weight increase of the film was 4.4%.

The current efficiency measured under similar cell operating conditions as Example 1 was 92%.

EXAMPLE 3

The conditions for treatment of a membrane described in Example 2 were repeated and the treated membrane tested in a test cell operating with a higher sodium hydroxide concentration (30 to 34% w/w) in the catholyte. Again the current efficiency was 92%.

EXAMPLES 4 TO 7

Samples of 'NAFION' membranes were treated in the same manner as that described in Example 1 but the monomer used was methylpentafluorobut-3-enoate $$CF_2=CFCF_2COOCH_3$$

The current efficiencies obtained with treated membranes derived from two grades of 'NAFION' are recorded in Table 1 at various sodium hydroxide concentrations in the catholyte in the test cell.

The current efficiency of a cell operating at 20% w/w sodium hydroxide concentration with an untreated film of 'NAFION' 110 was 58%.

TABLE 1

| | Current Efficiencies - (%) | | |
|---|---|---|---|
| Example No | Membrane | Sodium hydroxide concentration % NaOH w/w | Current Efficiencies % |
| 4 | Treated 'NAFION' 390 | 30 | 80 |
| 5 | Treated 'NAFION' 390 | 26 | 88 |
| 6 | Treated 'NAFION' 110 | 30 | 62 |
| 7 | Treated 'NAFION' 110 | 19 | 68 |

EXAMPLE 8

The procedure of Example 1 was repeated except that the film used was of 'NAFION' 117, and the radiation dose rate was 3.5 krad/hr to give a total absorbed dose of 359 krad.

The film weight increased by 4.7% and the current efficiency with a cell operating with a 30% w/w concentration of sodium hydroxide was 60%. A film of untreated 'NAFION' 117 had a current efficiency of 44% under these conditions.

EXAMPLE 9

The procedure of Example 8 was repeated except that pentafluorobut-3-enoic acid was replaced by methyl pentafluorobut-3-enoate. The film weight increased by 3.5% and the current efficiency under the same cell operating conditions was 55%.

EXAMPLE 10

The procedure of Example 8 was repeated except that the pentafluorobut-3-enoic acid was replaced by ethyl pentafluorobut-3-enoate.

We claim:

1. A process for treating a fluoropolymeric permselective membrane to improve its resistance to back-migration of hydroxyl ions when it is used in a chloralkali electrolysis cell, which process comprises contacting the surface of a preformed fluoropolymeric permselective membrane derived from a copolymer of tetrafluoroethylene and perfluorovinyl sulfonyl fluoride, with a monomer selected from the group consisting of perfluorobutenoic acid, methyl perfluorobut-3-enoate and ethyl perfluorobut-3-enoate, and then irradiating said membrane, while the surface thereof is in contact with said monomer, with high energy radiation so that the monomer is graft copolymerized onto said membrane, the resulting chemical bonding of the monomer to the polymer membrane increasing the resistance of said membrane to back-migration of hydroxy ions.

2. A process according to claim 1 wherein the monomer comprises perfluorobut-3-enoic acid.

3. A process according to claim 1 wherein the monomer comprises methyl perfluorobut-3-enoate.

4. A process according to claim 1 wherein the monomer comprises ethyl perfluorobut-3-enoate.

5. A process according to claim 1 wherein the high energy radiation is selected from the group consisting of γ-rays, X-rays and electron beams.

6. A process according to claim 5 wherein the weight increase in the fluoropolymeric membrane after graft copolymerization is less than 12%.

7. A process according to claim 6 wherein the said weight increase in the range of from 3 to 5%.

8. A fluoropolymeric permselective membrane prepared by a process according to claim 1.

* * * * *